United States Patent [19]

Saur et al.

[11] Patent Number: 4,957,955

[45] Date of Patent: Sep. 18, 1990

[54] PLASTISOLS BASED ON STYRENE/ACRYLONITRILE COPOLYMERS

[75] Inventors: Wolfgang Saur; Herbert Schreiber, both Freienbach, Switzerland; Günter Hilken, Cologne; Rolf Peter, Dormagen, both of Fed. Rep. of Germany

[73] Assignee: Bayer Aktiengesellschaft, Bayerwerk, Fed. Rep. of Germany

[21] Appl. No.: 283,205

[22] Filed: Dec. 12, 1988

Related U.S. Application Data

[63] Continuation of Ser. No. 094,903, Sep. 10, 1987, abandoned.

[30] Foreign Application Priority Data

Sep. 22, 1986 [CH] Switzerland ............... 03806/86
Oct. 17, 1986 [CH] Switzerland ............... 04159/86

[51] Int. Cl.$^5$ .................................................. C08K 5/15
[52] U.S. Cl. .................................... 524/114; 524/127; 524/297; 524/314; 524/502; 524/562; 524/565
[58] Field of Search ............ 524/565, 562, 297, 114, 524/314, 127, 502

[56] References Cited

U.S. PATENT DOCUMENTS

| | | | |
|---|---|---|---|
| 2,700,185 | 1/1955 | Lee ........................... | 524/565 |
| 2,811,505 | 10/1957 | Schulken et al. ........... | 524/565 |
| 2,957,023 | 10/1960 | Dimler et al. ............. | 524/565 |
| 2,962,463 | 11/1960 | Schroder et al. ........... | 524/565 |
| 3,021,327 | 2/1962 | Swahon ..................... | 524/565 |
| 3,050,488 | 8/1962 | Graham ..................... | 524/565 |
| 3,219,616 | 11/1965 | Saxon ....................... | 524/565 |
| 3,539,527 | 11/1970 | Stamm ....................... | 524/565 |
| 3,935,152 | 1/1976 | Hozumi et al. ............. | 524/565 |
| 3,940,405 | 2/1976 | Serad ....................... | 524/565 |
| 4,051,095 | 9/1977 | Karmell ..................... | 524/565 |
| 4,143,092 | 3/1979 | Karmell ..................... | 524/565 |
| 4,366,284 | 12/1982 | Ishido et al. ............. | 524/565 |
| 4,389,505 | 6/1983 | Hungerford ................. | 524/565 |
| 4,391,939 | 7/1983 | Hungerford ................. | 524/565 |

*Primary Examiner*—Joseph L. Schoffer
*Assistant Examiner*—J. M. Reddick
*Attorney, Agent, or Firm*—Connolly and Hutz

[57] ABSTRACT

Plastisols of 80 to 5% by weight plasticizer and 20 to 95% by weight particulate polymer containing (a) from 5 to 60% by weight acrylonitrile, methacrylonitrile or mixture thereof (b) from 15 to 95% by weight styrene, α-methyl styrene or mixture thereof (c) from 0 to 10% by weight of a carboxylic acid copolymerizable with the monomers (a) and (b), (d) from 0 to 30% by weight and, in the absence of component (c), from 10 to 30% by weight of an alkylester of acrylic acid, methacrylic acid or mixtures thereof optionally a diluent and other constituents, the percentages by weight of plasticizer and polymer being based on the sum of plasticizer and polymer and a process for making such plastisols.

7 Claims, No Drawings

PLASTISOLS BASED ON STYRENE/ACRYLONITRILE COPOLYMERS

This application is a continuation of U.S. application Ser. No. 07/094,903, filed 09/10/87 now abandoned.

This invention relates to storable dispersions of finely divided synthetic resins in plasticizers, hereinafter referred to as plastisols, to their production and their use.

Plastisols are liquid to paste-form mixtures which contain a particulate polymer dispersed in a liquid plasticizer.

An essential feature of plastisols is that the synthetic resin does not dissolve in the liquid plasticizer under standard storage conditions around room temperature, so that phase separation is maintained to such an extent that the product is fluid.

Another essential feature of plastisols is that, on heating to a temperature of normally from 160 to 200° C., a solution of the synthetic resin in the plasticizer is formed, having the properties of a solid in view of the high polymer concentration. On cooling to room temperature, the gelled solution permanently retains its homogeneous character which may vary from brittle and hard to soft, viscous and tacky.

This irreversible change of state is known among experts as gelation or gelatinization.

A plasticizer may be regarded as any liquid which, as a component of a plastic or synthetic resin, satisfies the requirements for a plastisol. One of these requirements is a very low volatility because otherwise the plasticizer could gradually escape during storage of the gelled plastisols, giving rise to undesirable property changes.

Technically important plasticizers are, for example, the esters of phthalic acid, adipic acid, sebacic acid, azelaic acid, citric acid and phosphoric acid, chlorinated hydrocarbons, liquid polyesters and epoxidized natural oils, such as linseed oil or soya oil.

Detailed definitions of what a plasticizer is and of the chemical-physical interaction between plasticizer and plastic or synthetic resin particles can be found in K. Weinmann in "Beschichten mit Lacken und Kunststoffen", Verlag W. A. Colomb, Stuttgart, 1967, pages 47 to 158.

The compatibility of a large number of standard plasticizers with various polymers is discussed by F. Stuhlen and L. Meier in "Kunststoff-Rundschau", 19, pages 251 to 260 and 316 to 319 (1972).

Theoretically, any polymeric resin may be converted into a plastisol by suitable choice of the constituents. In practice, both technical application and also the technical literature have concentrated almost exclusively on the use of polyvinyl chloride (PVC) to form plastisols.

This dominant position of PVC in the commercial plastisol field originates from the fact that no suitable plasticizers could be found for numerous polymers otherwise having extremely advantageous and desirable properties, because dispersions of unsuitable viscosity and storability are obtained, the plasticizers exude from the gelled plastisols again or the gels show inadequate mechanical properties.

Although PVC has been successfully used in many respects as a polymeric component in plastisols, it is increasingly found to be a disadvantage that, on heating, this polymer gives off hydrogen chloride which can lead to corrosion in manufacturing processes where heat is applied or which can occur in dangerously high concentrations in the event of a fire or in the incineration of waste. This lack of stability of PVC, which—in addition to the evolution of hydrogen chloride—leads to embrittlement and discoloration, necessitates the use of, in some cases, toxic stabilizers such as, for example, lead and cadmium compounds.

Accordingly, it would be particularly desirable to use resin-like acrylate and vinyl ester polymers and copolymers for plastisols if they were not attended by these disadvantages with respect to PVC.

Plastisols of acrylate polymers ("acrylate plastisols") have already been proposed. DE-PS 2 454 235 and DE-PS 2 529 732 describe the use of acrylate polymers having a Tg above 35° C., in which the Tg, particle diameter and composition of the dispersed polymer particle are coordinated with one another, and special plasticizer mixtures. However, these acrylate plastisols are not yet satisfactory.

US-PS 4 071 653 and DE-PS 2 543 542, 2 722 752 and 2 949 954 describe methacrylate particles of special composition which, by virtue of the fact that they consist of a core showing particularly high compatibility with plasticizers and of a shell showing poor compatibility with plasticizers, are characterized by high stability of the liquid plastisol in storage. US-PS 4 176 028, GB-PS 1 598 579, DE-PS 2 812 014, 2 812 015 and 2 812 016 all describe the use of acrylate or methacrylate polymers.

All these attempts to process acrylate polymers into plastisols are characterized by the fact that they all rely on a very special choice of the raw materials which restricts the potential applications of the plastisols. In addition, they do not achieve the outstanding product properties of PVC plastisols in regard to stability in storage.

In addition, it is proposed in DE-OS 3 308 925 to combine synthetic resins, such as vinyl ester copolymers, (meth)acrylate copolymers and plasticizers selected freely within the basic conditions described above for plastisols, to form plastisols by stabilizing the dispersions with protective colloids under standard storage conditions around room temperature, with the proviso that the stabilizing effect is eliminated during gelation at elevated temperature and the protective colloids serving as stabilizer are integrated into the resulting plastigel.

This method has the same disadvantages as the methods described above. In addition, the nature of the protective colloids imposes a serious limitation in terms of practical application.

Accordingly, there is a need for new plastisols which exhibit the excellent processing and product properties of PVC plastisols, but which gel even at relatively low temperatures and, in addition, are free from chlorine, i.e. can give off neither chlorine nor hydrogen chloride, which are universally useable and which eliminate the need to use basically unnecessary auxiliaries, such as protective colloids, shells incompatible with plasticizers and the like.

It has surprisingly been found that plastisols such as these can be obtained on the basis of special styrene/acrylonitrile copolymers which are characterized by their monomer composition.

Accordingly, the present invention relates to plastisols of 80 to 5% by weight plasticizer and 20 to 95% by weight particulate polymer containing
  (a) from 5 to 60% by weight and preferably from 10 to 45% by weight acrylonitrile and/or methacrylonitrile, (b) from 15 to 95% by weight and preferably from 30 to 75% by weight styrene and/or u-methyl styrene, (c) from 0 to 10% by weight and preferably from 0.5 to 6% by weight of a carboxylic acid copolymerizable with the monomers (a) and/or (b), (d) from 0 to 30% by weight, preferably from 10 to 30% by weight and, particularly in the absence of component (c), from 10 to 30% by weight acrylic acid and/or methacrylic acid alkyl ester, preferably with $C_2-C_{12}$ alcohols, optionally a diluent and other standard constituents, the percentages by weight of plasticizer and polymer being based on the sum of plasticizer and polymer.

In addition to the plasticizer, plastisols according to the invention may also contain up to 20% of an inert solvent which does not promote gelation.

Carboxylic acids (c) suitable for the purposes of the invention are, for example, acrylic acid, methacrylic acid, maleic acid, itaconic acid, fumaric acid or mixtures thereof.

Emulsion-polymerized copolymers are particularly suitable for the plastisols according to the invention. It has been found that the nature of the polymerization reaction has a distinct effect on the properties of the plastisols according to the invention, particularly their paste stability. The copolymers produced by emulsion polymerization are particularly advantageous when they have been produced by emulsion polymerization in such a way that the average particle diameter is specifically adjusted to 0.2 to 1.5 μm (determination method, ultracentrifuge) in known manner (HoubenWeyl, Vol. XIV/1 (1961), pages 339 et seq.) using the socalled seed latex process.

In this process, a certain quantity of a latex is introduced in seed form, after which preparation of the dispersion is carried out starting from these seeds by polymerization of a monomer or monomer mixture.

According to a correlation known from Houben-Weyl, Vol. XIV/1 (1961), page 340, the mean diameter of the latex particles thus obtained is dependent on the mean diameter of the particles in the seed latex and on the cubic route of the quotient of the quantity of polymer after polymerization and the quantity of polymer in the seed latex, provided that no new latex particles are formed as seeds during Polymerization and the density of the polymer remains constant during polymerization.

If, therefore, it is desired significantly to increase the mean diameter of the latex particles by this process, the quantity of polymer in the seed latex must be kept as small as possible. In the production of the polymers according to the invention, the seed latex is normally used in such a quantity that from 1 to 30% and preferably from 1.5 to 15% of the quantity of polymer obtained was initially introduced in the form of the seed latex. Under these conditions, the polymerization reaction proceeds very slowly in some cases and the further additions of emulsifier have to be adapted exactly so that, on the one hand, no new particles are formed and, on the other hand, no coagulation occurs.

The preparation of the seed latex, which may take place separately, may be carried out by known methods of emulsion polymerization by adjusting the latex particle sizes, for example by variation of the type and quantity of emulsifier or emulsifier mixture and initiator used.

In principle, the latices obtainable by the described seed latex process may be used as the seed latex.

To convert the generally 30 to 60% dispersions obtained into a dry powder, the dispersions are dried in known manner by drying in the form of thin layers in flat containers or on rolls or by spray drying.

Particles obtained by spray drying have proved to be particularly advantageous, particularly if temperatures at which the primary particles of the emulsion polymer sinter together In the particle aggregates to form a hard mass have been avoided during the spray drying process. The secondary particles thus produced have mean particle diameters of from 1 to 100 μm and preferably from 5 to 50 μm (determination method: laser diffraction).

The polymers used to produce the plastisols according to the invention preferably have a gel content of from 1 to 90%, as measured in tetrahydrofuran (20° C.).

Not all plasticizers are equally suitable for the plastisols according to the invention because many possible combinations are either incompatible or show inadequate stability in storage. An increasingly polar plasticizer is required with increasing content of (meth)acrylonitrile in the polymer.

Preferred plasticizers are those for which the relation between the (meth)acrylonitrile content of the polymer (% by weight (M)AN) and the plasticizer properties (density d and number of aliphatic carbon atoms $C_{ali}$) may be represented as follows:

$$\% \text{ by weight } (M)AN \leq 200 \cdot d - \frac{36}{1 + C_{ali}} - 168 \quad (I)$$

$$\% \text{ by weight } (M)AN \geq 183 \cdot d - \frac{45}{1 + C_{ali}} - 166 \quad (II)$$

To obtain adequate compatibility, the (meth)acrylonitrile content preferably has to satisfy relation (I). Adequate stability in storage is generally achieved where the (meth)acrylonitrile content satisfies relation (II).

An exception to these two rules are plasticizers containing cycloaliphatic groups, for example dicyclohexylphthalate, which also form stable plastisols with polymers of considerably lower (meth)acrylonitrile content.

In principle, plasticizer mixtures may also be classified in this way. For example, the plasticizer C.9 in Table 1 consists of a mixture of dibenzyl, dibutyl and benzylbutylphthalate. However, even with mixtures such as these, the quantitative ratios useable in practice are somewhat narrower than the calculated quantitative ratios.

In addition to the constituents according to the invention, the plastisols may optionally contain auxiliaries such as, for example, viscosity regulators, sedimentation inhibitors, flow promoters, perfumes, wetting agents, extenders, adhesion promoters, antiagers, oxidation inhibitors and UV stabilizers, blowing agents for foams and other auxiliaries of the type commonly used in coating and plastisol technology. It is also possible to add organic and/or inorganic pigments and fillers as well as soluble dyes.

The plastisols according to the invention may be used for a wide variety of applications. Typical applications include, for example, the coating of fabrics for tent covers and apparel, the better light stability of the polymers compared with PVC being particularly advantageous in this regard, seals for crown corks, antinoise compositions, seam-sealing compounds and bonding agents with particularly low stoving temperatures for the automotive industry, the production of moldings, particularly toys, by rotational molding or by the hot dip process, the production of artificial leather.

The plastisols prepared in accordance with the invention are processed by any of the standard methods for processing plastisols (cf. for example H. A. Sarretnick "Plastisols and Organosols", Van Nostrand Reinhold Company, New York 1972).

EXAMPLES

Example 1 (General Procedure)

Preparation of the polymer powder (a) Seed latex

In a Witt pot equipped with a reflux condenser, stirrer (150 r.p.m.) and two feed vessels, 0.28 g potassium peroxodisulfate and 0.70 g of the sodium salt of a $C_{12}$ paraffin sulfonate (Mersolat K 30, a product of Bayer AG) are dissolved at 80° C. in 1960 g distilled water. 140 g monomer mixture are immediately introduced into this solution, followed by polymerization with stirring for 1 hour at 80° C. The following additions are then made uniformly with stirring over a period of 3 hours at 80° C.:
Addition 1: 1260 g monomer mixture
Addition 2: solution of
  126 g distilled water
  1.3 g sodium hydrogen carbonate
  2.8 g potassium peroxodisulfate
  6.3 g Mersolat K 30

At the end of the addition, the mixture is left standing for 1 hour at 80° C. After cooling to room temperature, the mixture is filtered through a fine-mesh sieve cloth. The dispersion has a solids content of approximately 40%.

(b) Seed latex process 1850 g distilled water and 130 g of the seed latex according to-a) (40%) are introduced at 80° C. into a Witt pot equipped with a reflux condenser, stirrer (150 r.p.m.) and two feed vessels. 42 g monomer mixture are then introduced with stirring. After 10 minutes, a solution of 0.5 g potassium peroxodisulfate in 10 ml distilled water is introduced, followed immediately afterwards by the addition over a period of 7 hours with stirring at 80° C. of
Addition 1: 1360 g monomer mixture
Addition 2: a solution of 126 g distilled water
  1.3 g sodium hydrogen carbonate
  1.2 g potassium peroxodisulfate
  6.3 g Mersolat K 30

At the end of the addition, the mixture is left standing for 1 hour at 80° C. After cooling to room temperature, the mixture is filtered through a fine-mesh sieve cloth. The dispersion has a solids content of approximately 40%.

(c) Drying of the polymer dispersion

The dispersion according to b) is introduced in concurrent with air at approximately 160° C. into a spray-drying tower equipped with a two-component nozzle. The quantitative ratio of dispersion to air is adjusted in such a way that the sprayed material leaves the tower at an air exit temperature of approximately 60° C. in the form of a dry, finely divided, white to translucent powder free from any glassy constituents.

The polymer powders according to Tables 2 and 3 are prepared by this method. The monomer mixtures correspond to the polymer composition shown in those Tables and are suitable for the preparation of the seed latex and for the seed latex process.

Examples 2 to 54

Plastisols were prepared by mixing the polymer powders prepared in accordance with Example 1 into the plasticizers mentioned in Table 1.

The mixing ratio was 1 g polymer to 1 g plasticizer and 4 g polymer to 6 g plasticizer. The properties of the plastisols and of the gels after gelation for 10 minutes at 160° C. are shown in Table 2.

Examples 2 and 3 are comparison examples with polymers without (meth)acrylonitrile. They produced a gel without any mechanical strength which flowed under slow deformation.

Examples 55 to 59

Table 3 shows the behavior of gel samples in a tensile test at room temperature. Composition of the gels: 100 parts by weight Polymer: 100 parts by weight "Santicizer 148" (Table 1). Gelation conditions: 20 minutes at 190° C.

Composition of the polymers' acrylonitrile 40% by weight, acrylic acid 3% by weight, styrene and flexibilizing monomer together 57% by weight.

Example 60

To prepare an adhesive for metals, a mixture of 22 parts by weight "Santicizer 148" (P2) (Table 1)
15 parts by weight resorcinol-formaldehyde resin (Penacolite ® Resin B-1A, Koppers Comp. USA)
40 parts by weight polymer as in Example 55
1 part by weight pyrogenic silica (HDK N 20 E, Wacker GmbH, FRG)

was ground on a roll stand.

After curing for 20 minutes at 210° C., strengths of 10 $N/mm^2$ at room temperature and 7 $N/mm^2$ at −40° C. were obtained in tensile shear tests on smooth, oiled iron sheets.

Example 61

To prepare a filler-containing plastisol, a mixture of 20 parts by weight "Witamol 112 (C5)" (Table 1)
20 parts by weight white spirit (boiling range 155-181° C.)
10 parts by weight chalk
0.05 part by weight carbon black (for coloring)
2.5 parts by weight titanium white
50 parts by weight polymer as in Example 4
was ground.

12 parts by weight of a 66% by weight solution of a polyurethane prepolymer having a residual NCO content of 14% (Liquid Prepolymer; Urethane International Int.) were added as primer.

A coating on a painted iron sheet shows a peel strength of 38 to 63 N/cm after curing for 30 minutes at 180° C. This organosol is suitable for coatings, for example as an underseal for motor vehicles.

TABLE 1

| | | | Plasticizers | | | | | | |
|---|---|---|---|---|---|---|---|---|---|
| | | | Chemical composition | | | | | | |
| Code name | Trade Name | Chemical name | C-aliphatic | C-aromatic | COO | $PO_4$ | Cl/O/S | Density $q/cm^3$ | Molecular weight |
| C1 | Lipinol | Octyl fatty acid ester | 23 | — | 1 | — | — | 0.8515 | 368 |
| C2 | Reamol DIDA | Diisodecyl adipate | 24 | — | 2 | — | — | 0.912 | 426 |
| C3 | Witamol 500 | Dioctyl sebacate | 22 | — | 2 | — | — | 0.913 | 398 |
| C4 | Citroflex A-4 | Acetyl tributyl citrate | 16 | — | 4 | — | — | 1.048 | 402 |
| C5 | Witamol 112 | Di-n-$C_{10}$-$C_{12}$-alkyl phthalate (straight-chain) | 22 | 6 | 2 | — | — | 0.96 | 474 |
| C6 | Adimoll BO | Benzyl octyl adipate | 13 | 6 | 2 | — | — | 1.00 | 348 |
| C7 | Edenol 344 | Dimethyl cyclohexyl phthalate | 14 | 6 | 2 | — | — | 1.075 | 358 |
| C8 | Santicizer 261 | Benzyl octyl phthalate | 9 | 12 | 2 | — | — | 1.07 | 368 |
| C9 | Unimol BB | Benzyl butyl phthalate | 5 | 12 | 2 | — | — | 1.12 | 312 |
| P1 | Disflamol TOF | Trioctyl phosphate | 24 | — | — | 1 | — | 0.92 | 434 |
| P2 | Santicizer 148 | Isodecyl diphenyl phosphate | 10 | 12 | — | 1 | — | 1.06 | 390 |
| P3 | Disflamol DPO | Diphenyl octyl phosphate | 8 | 12 | — | 1 | — | 1.09 | 362 |
| P3 | Santicizer 141 | Diphenyl octyl phosphate | 8 | 12 | — | 1 | — | 1.09 | 362 |
| P4 | Disflamol TKP | Tricresyl phosphate | 3 | 18 | — | 1 | — | 1.18 | 368 |
| P5 | Disflamol DPK | Diphenyl cresyl phosphate | 1 | 18 | — | 1 | — | 1.20 | 340 |
| P6 | Disflamol TCA | Trichloroethyl phosphate | 6 | — | — | 1 | 3 × Cl | 1.42 | 285.5 |
| S1 | Lipinol T | Dibenzyl toluene | 3 | 18 | — | — | — | 1.035 | 272 |
| S2 | Plastilit | Polypropyleneglycol alkyl phenyl ether | not known | | | | | | |
| S3 | Desavin | Di(phenoxyethyl)formal | 5 | 12 | — | — | 4 × O | 1.13 | 288 |
| S4 | Mesamol | Phenol alkylsulfonic acid ester | 15 | 6 | — | — | $SO_3$ | 1.05 | 368 |

TABLE 2

| Example no. | Polymer composition[1] ST | AN | AS | BA | Plasticizer according to Table 1 | Ratio of polymer: plasticizer | Plastisol properties (days at RT after mixing) state after 1 d | liquid | viscous | pasty | doughy | powdery kneadable | gelled kneadable | gelled | Gel properties after 20' at 160° C.[2] | Shore A hardness after 3" |
|---|---|---|---|---|---|---|---|---|---|---|---|---|---|---|---|---|
| 2 | 82 | 0 | 3 | 15 | C7 | 1:1 | viscous | | 2 | 3-37 | | | | 40 | flows | 33 |
| 3 | | | | | " | 4:6 | viscous | | 8 | 9-15 | | | | 16 | flows | 16 |
| 4 | 72 | 10 | 3 | 15 | C5 | 1:1 | pasty | | | 15 | 16-27 | | | 28 | g | 8 |
| 5 | | | | | " | 4:6 | liquid | 12 | | 13-14 | 15-24 | | | 25 | gc | 3 |
| 6 | | | | | C7 | 1:1 | viscous | | 2 | 3-37 | | | 28 | <28 | ga | 30 |
| 8 | 62 | 20 | 3 | 15 | S1 | 4:6 | pasty | 1 | >30 | 2 | | 3-22 | | 23 | g | 6 |
| 9 | | | | | C7 | 1:1 | viscous | | >30 | | | | | >30 | ga | 76 |
| 10 | | | | | " | 4:6 | viscous | | >30 | | | | | >30 | ga | 59 |
| 11 | 52 | 30 | 3 | 15 | S4 | 4:6 | liquid | 30 | | | | | | >30 | gc(e) | 36 |
| 12 | | | | | C4 | 1:1 | liquid | 4 | 5-20 | | | | | >20 | gc | 20 |
| 13 | | | | | C7 | 1:1 | viscous | | 50 | | | | | >50 | ga | 96 |
| 14 | | | | | " | 4:6 | viscous | | 30 | | | | | >30 | ga | 85 |
| 15 | | | | | C8 | 1:1 | liquid | | | | | | | 7 | ga | 29 |
| 16 | | | | | " | 4:6 | liquid | 2 | 3-12 | 13-18 | | | | 19 | g | 6 |
| 17 | 47 | 35 | 3 | 15 | C4 | 1:1 | liquid | 7 | | | | | | 8 | ww | 79 |
| 18 | | | | | C7 | 1:1 | liquid | 7 | 8-57 | | | | | >57 | ww | 95 |
| 19 | | | | | C8 | 1:1 | liquid | 24 | | | | | | >24 | g | 64 |
| 20 | 42 | 40 | 3 | 15 | C8 | 1:1 | liquid | 14 | 15-17 | | | | | >21 | w | 76 |
| 21 | | | | | S3 | 1:1 | liquid | | | 4 | 5-18 | | | 19 | gc | 24 |
| 22 | | | | | P2 | 1:1 | liquid | | | >30 | | | | >30 | p | 31 |
| 23 | | | | | " | 4:6 | liquid | 24 | 25->29 | | | | | >29 | g | 11 |
| 24 | | | | | P3 | 1:1 | liquid | | | 14 | | | | 15 | g | 25 |
| 25 | | | | | " | 4:6 | pasty | 1 | | 2-10 | 11-15 | | | 16 | g | 7 |
| 26 | | | | | P4 | 1:1 | liquid | 6 | 7->26 | | | | | >26 | g | 29 |

TABLE 2-continued

| Example no. | Polymer composition[1] ST | AN | AS | BA | Plasticizer according to Table 1 | Ratio of polymer:plasticizer | Plastisol properties (days at RT after mixing) state after 1 d | liquid | viscous | pasty | doughy | powdery kneadable | gelled kneadable | gelled | Gel properties after 20' at 160° C.[2] | Shore A hardness after 3" |
|---|---|---|---|---|---|---|---|---|---|---|---|---|---|---|---|---|
| 27 | | | | | " | 4:6 | liquid | 22 | 23-24 | 25->32 | | | | >32 | g | 7 |
| 28 | | | | | C9 | 1:1 | viscous | | 1 | 2-24 | | | | 25 | g | 21 |
| 29 | | | | | " | 4:6 | liquid | >30 | | | | | | >30 | g | 8 |
| 30 | | | | | P5 | 1:1 | liquid | | | | | 8 | | 9 | g | 23 |
| 31 | 39 | 43 | 3 | 15 | 53 | 1:1 | liquid | 6 | 7->26 | | | | | >26 | w(e) | 54 |
| 32 | | | | | P2 | 1:1 | liquid | 3 | 4->20 | | | | | >20 | w | 65 |
| 33 | | | | | P3 | 1:1 | liquid | 5 | 6->27 | | | | | >27 | g | 38 |
| 34 | | | | | P4 | 1:1 | liquid | 7 | 8->29 | | | | | >29 | g | 60 |
| 35 | | | | | C9 | 1:1 | liquid | 6 | 7->26 | | | | | >26 | g | 38 |
| 36 | | | | | P5 | 1:1 | liquid | 3 | 4->19 | | | | | >19 | g | 44 |
| 37 | 36 | 46 | 3 | 15 | P3 | 1:1 | liquid | 3 | 4->19 | | | | | >19 | w | 56 |
| 38 | | | | | P4 | 1:1 | liquid | 20 | | | | | | >20 | g | 77 |
| 39 | | | | | C9 | 1:1 | liquid | >29 | | | | | | >29 | g | 69 |
| 40 | | | | | P5 | 1:1 | liquid | 2 | 3->23 | | | | | >23 | g | 68 |
| 41 | 32 | 50 | 3 | 15 | P4 | 1:1 | Liquid | >7 | | | | | | >21 | ww | 88 |
| 42 | | | | | C9 | 1:1 | Liquid | >30 | | | | | | >30 | ww | 74 |
| 43 | | | | | P5 | 1:1 | doughy | | | | >30 | | | >30 | w | 72 |
| 44 | 43 | 42 | 0 | 15 | C8 | 1:1 | liquid | 15 | 16->30 | | | | | >30 | w(e) | 59 |
| 45 | | | | | S3 | 1:1 | pasty | | | 1 | | 2-22 | | 23 | g | 27 |
| 46 | | | | | P2 | 1:1 | " | | | 9 | | 10-30 | 31->100 | >100 | g | 51 |
| 47 | | | | | P3 | 1:1 | liquid | 9 | | | | 10-25 | 26->40 | >40 | g | 40 |
| 48 | | | | | P3 | 4:6 | liquid | 8 | 9-30 | | | | | >30 | gc | 16 |
| 49 | | | | | P4 | 1:1 | pasty | | | 1 | | 2->30 | | >30 | g | 37 |
| 50 | | | | | " | 4:6 | liquid | 4 | 5->30 | | | | | >30 | g | 17 |
| 51 | | | | | C9 | 1:1 | pasty | 1 | | 19 | | | | 21 | g | 26 |
| 52 | | | | | " | 4:6 | doughy | | | <1 | 2-12 | | | 13 | g | 10 |
| 53 | | | | | P5 | 1:1 | pasty | | | 9 | | 10-18 | | 19 | g | 29 |
| 54 | | | | | " | 4:6 | " | 1 | 2-8 | 9-10 | | | | 10 | g | 11 |

Explanation of symbols in Table 2
[1] ST = styrene
AN = acrylonitrile
AS = acrylic acid
BA = butyl acrylate
[2] Gel properties:
g = readily gellable
gA = readily gellable, adheres to Alu sheet
gC = readily gellable, cloudy
w = slight white fracture
ww = serious white fracture
(e) = exudes slightly
e = exudes heavily
p = cloudy pearl structure

TABLE 3

| | | Gel properties with Santicizer 148 (1:1) gelled for 20' at 190° C. | | | | |
|---|---|---|---|---|---|---|
| Example No. | Flexibilizing monomer | Modulus [N/mm$^2$] 100% | 200% | break | Elongation, max. | Shore A max./30" |
| 55 | 10% butyl acrylate | 2.0 | 4.9 | 5.7 | 215% | 77/44 |
| 56 | 15% butyl acrylate | 1.2 | 3.2 | 6.0 | 255% | 64/30 |
| 57 | 20% butyl acrylate | 0.9 | 2.7 | 7.1 | 285% | 60/22 |

TABLE 3-continued

| | | Gel properties with Santicizer 148 (1:1) gelled for 20' at 190° C. | | | | |
|---|---|---|---|---|---|---|
| Example No. | Flexibilizing monomer | Modulus [N/mm²] 100% | 200% | break | Elongation, max. | Shore A max./30" |
| 58 | 15% 2-ethylhexyl acrylate | 0.8 | 2.1 | 7.0 | 310% | 59/24 |
| 59 | 20% 2-ethylhexyl acrylate | 1.3 | 3.6 | 5.9 | 240% | 64/33 |

We claim:

1. A plasticol comprising 80 to 5% by weight of a plasticizer where the plasticizer is a liquid selected from an ester of phthalic acid, adipic acid, sebacic acid, azelaic acid, citric acid or phosphoric acid; a chlorinated hydrocarbon; a polyester or an expoxidized natural oil and 20 to 95% by weight of a particulate polymer containing
   (a) from 5 to 60% by weight acrylonitrile, methacrylonitrile or mixtures thereof,
   (b) from 15 to 95% by weight styrene, α-methyl styrene or mixtures thereof,
   (c) from 0 to 10% by weight of acarboxylic acid copolymerizable with the monomers (a) and (b),
   (d) from 0 to 30% by weight of an alkylester of acrylic acid, methacrylic acid or mixtures thereof, with the proviso that when there is 0% by weight (c), there is from 10 to 30% by weight (d), the percentages by weight of plasticizer and polymer being based on the sum of plasticizer and polymer.

2. A plastisol as claimed in claim 1, the polymer of which has been prepared by emulsion polymerization in the form of a latex and has a mean particle diameter in the latex of from 0.2 to 1.5 μm.

3. A plastisol as claimed in claim 1, wherein the polymer is obtained by emulsion polymerization in the form of a latex and has been dried by spray drying.

4. A plastisol as claimed in claim 1, wherein the polymer particle size is from 1 to 100 μm.

5. A plastisol as claimed in claim 1, wherein the relation between the (meth)acrylonitrile content of the polymer and the plasticizer properties satisfies the following relation:

$$\% \text{ by weight } (M)AN \leq 200 \cdot d - \frac{36}{1 + C_{ali}} - 168$$

where
(M)AN represents the amount of component (a), d is the density of the plasticizer and $C_{ali}$ is the average number of aliphatic carbons in the molecule of the plasticizer.

6. A plastisol as claimed in claim 1, wherein the relation between the (meth)acrylonitrile content of the polymer and the plasticizer properties satisfies the following relation:

$$\% \text{ by weight } (M)AN \text{ of component } a) \geq 183 \cdot d - \frac{45}{1 + C_{ali}} - 166$$

where (M)AN represents the amount of component (a), d is the density of the plasticizer and $C_{ali}$ is the average number of aliphatic carbon atoms in the molecule of the plasticizer.

7. A plastisol as claimed in claim 1, wherein the polymer contains from 1 to 90% by weight gel.

* * * * *

UNITED STATES PATENT AND TRADEMARK OFFICE
CERTIFICATE OF CORRECTION

PATENT NO. : 4,957,955

DATED : September 18, 1990

INVENTOR(S) : Sauer et al.

It is certified that error appears in the above-identified patent and that said Letters Patent is hereby corrected as shown below:

On the title page item [73] Assignee:

Please correct the assignees of this patent as follows:

Bayer Aktiengesellschaft, Leverkusen, Germany;

and

Gurit-Essex AG, Freienbach, Switzerland.

Signed and Sealed this

Fifth Day of May, 1992

Attest:

DOUGLAS B. COMER

*Attesting Officer*     *Acting Commissioner of Patents and Trademarks*